United States Patent [19]

Iwamoto et al.

[11] Patent Number: 5,537,222
[45] Date of Patent: Jul. 16, 1996

[54] IMAGE EDIT APPARATUS PROVIDING SYNCHRONIZATION BETWEEN IMAGE DATA AND EDIT COMMANDS

[75] Inventors: Yasuhiko Iwamoto; Kazuman Taniuchi; Hiroshi Sekine; Yoshio Ichiyanagi; Sadao Furuoya, all of Kanagawa, Japan

[73] Assignee: Fuji Xerox Co., Ltd., Tokyo, Japan

[21] Appl. No.: 879,920

[22] Filed: May 8, 1992

[30] Foreign Application Priority Data

May 14, 1991 [JP] Japan ..................... 3-107957

[51] Int. Cl.$^6$ .................. H04N 1/387; H04N 1/40; H04N 1/36
[52] U.S. Cl. .................. 358/452; 358/460; 358/443; 358/409
[58] Field of Search .................. 358/445, 455, 358/456, 462, 463, 464, 465, 466, 450, 78, 409, 410, 411, 420, 494, 497, 443, 404, 261.4, 448, 452, 451, 460; 364/395

[56] References Cited

U.S. PATENT DOCUMENTS

| | | | |
|---|---|---|---|
| 3,843,839 | 10/1974 | Campbell | 178/6 |
| 4,868,552 | 9/1989 | Chang | 340/721 |
| 4,949,190 | 8/1990 | Thompson | 358/426 |
| 4,954,951 | 9/1990 | Hyatt | 364/200 |
| 4,999,718 | 4/1991 | Arai | 358/455 |
| 5,111,533 | 5/1992 | Sekine et al. | 358/518 |
| 5,113,251 | 5/1993 | Ichiyanagi | 358/75 |
| 5,132,786 | 7/1992 | Ishiwata | 358/500 |
| 5,142,355 | 8/1992 | Fujima | 358/75 |
| 5,189,528 | 2/1993 | Takashima et al. | 358/464 |
| 5,200,832 | 4/1993 | Taniuchi et al. | 358/527 |
| 7,486,059 | of/0000 | Ishiwata . | |

FOREIGN PATENT DOCUMENTS

| | | |
|---|---|---|
| 62-181570 | 8/1987 | Japan . |
| 2-224569 | 9/1990 | Japan . |

*Primary Examiner*—Scott A. Rogers
*Assistant Examiner*—Allan A. Esposo
*Attorney, Agent, or Firm*—Finnegan, Henderson, Farabow, Garrett & Dunner

[57] ABSTRACT

A image edit apparatus in which area data of 16-bit width have been stored at the memory locations of the corresponding addresses of the respective memory planes of a plane memory 403. The operation of reading area data therefrom by a pseudo sync signal starts before a line sync signal becomes active. A density-conversion/area generating circuit 405 converts the data format from the plane type to the pixel type, so that area commands are generated. Then, the circuit 405 reads an edit command out of a logic RAM, using the area command as address, and outputs the command. By reading the area data earlier and processing that data, a delay in the density-conversion/area generating circuit can be absorbed, so that the output edit command is synchronized with the image data.

2 Claims, 14 Drawing Sheets

NUMBER OF REFRESHINGS = 2
(a = 2)

IMAGE EDIT APPARATUS PROVIDING SYNCHRONIZATION BETWEEN IMAGE DATA AND EDIT COMMANDS

BACKGROUND OF THE INVENTION

1. Field of the Invention

The present invention relates to an image edit apparatus capable of applying edit commands stored in a logic RAM to an original document by writing area data into a plane memory by a graphic controller, for example.

2. Description of the Prior Art

An image processing apparatus, for example, a digital color copying machine, generally includes an image read unit for reading an image on an original an document by scanning the original, image data processing unit for processing/editing read image data, a record unit for recording processed/edited image data, and a control unit for controlling the image reading, processing, editing, and recording operations. The image processing unit edits image data in various ways. Examples of edit function techniques are proposed in Unexamined Japanese Patent Publications Sho-62-181570 and Hei-2-224569, for example.

The outline of a digital color copying machine with edit functions will be described with reference to Japanese Patent Publication Hei-2-224569.

FIG. 15 is a diagrammatic view showing the construction of the digital color copying machine with a film image reader.

In the color copying machine, a base machine 30 is made up of a platen glass 31 on which an original document is placed, an image input terminal (IIT) 32, an electric-control-board container 33, an image output terminal (IOT) 34, a paper tray 35, and a user interface (U/I) 36. The color copying machine is optionally provided with an edit pad 61, an automatic document feeder (ADF) 62, a sorter 63, and a film image reader having a filter projector (F/P) 64 and a mirror unit (M/U) 65.

The IIT 32 includes an imaging unit 37, a wire 38 for driving the imaging unit, drive pulleys 39, and the like. In the IIT 32, a color image on a color original document is separated into three primary colors B (blue), G (green), and R (red) by means of filters within the imaging unit 37, and is read by a CCD line sensor. The image data thus obtained is converted into multi-tone digital image signals B, G and R, and output to an image processing system. The image processing system, contained in the electric-control-board container 33, receives the B, G and R image signals, applies various types of conversion and correction processings to those image signals to improve image quality, such as color, tone and definition, and reproduction performances, and performs additional edit processings on the color image data. Further, the image processing system converts the image colors into the toner primary colors Y (yellow), M (magenta), C (cyan), and K (black), converts tone toner signals of the process colors into on/off or binary-coded signals, and outputs those converted signals to the image output terminal 34. In the IOT 34 including a scanner 40, and a photoreceptor belt 41, the image signals are converted into optical image signals by a laser output unit 40a. The optical image signals are imaged, in the form of a latent electrostatic image corresponding to the original color image, on the photoreceptor belt 41 through the combination of a polygonal mirror 40b, an F/θ lens 40c, and a reflection mirror 40d. The thus formed color image is transferred onto a paper supplied from the paper tray 35, and is output in the form of a color copy.

In the IOT 34, the photoreceptor belt 41, driven by a drive pulley 41a, is provided. A cleaner 41b, a charger 41c, Y, M, C and K developing units 41d, and a transfer unit 41e are disposed around the photoreceptor belt 41. A transfer device 42 is further provided in connection with the transfer unit 41e. The transfer device 42 which nips a recording paper supplied through a paper transfer path 35a from the paper tray 35, is rotated four times in the case of 4-color full copy to transfer Y, M, C and K latent images on the paper. The paper bearing the four latent images is forwarded from the transfer device 42 through a vacuum transfer unit 43 to a fusing unit 45. After the latent images of Y, M, C and K are fused and fixed on the recording paper, the paper is discharged. An SSI (single sheet inserter) 35b allows a user to manually and selectively supply recording paper into the paper transfer path 35a.

The U/I (user interface) 36 allows the user to select desired functions and to instruct the conditions to execute the functions. The U/I 36 is provided with a color display 51 and a hard control panel 52. Additional use of an infrared touch board 53 enables the user to directly enter instructions with touch buttons on the screen.

The electric-control-board container 33 contains a plurality of control boards for the IIT 32, IOT 34, U/I 36, image processing system (IPS), film projector 64, and the like, an MCB board (machine control board) for controlling the operations of the IOT 34, ADF 62, sorter 63, and the like, and an SYS board for controlling all those units.

FIG. 16 is a block diagram showing the arrangement of the image data processing system of the prior color digital copying machine. In the figure, an IIT 100 separates a color document image into three primary colors B, G, and R, and reads the color document image by using a CCD sensor. An IOT 115 reproduces a color image through the exposure process by the laser beam and the development processes. The components ranging from an END conversion circuit 101 to an IOT interface 110, which are located between the IIT 100 and the IOT 115, make up an image data edit processing system (image processing system (IPS)). In the IPS, color image data of B, G, and R are converted into image data of process toner colors Y, M, and C, and further K. Every developing cycle, the toner signal corresponding to that developing color is output.

In the IIT, the CCD sensor reads the document images of B, G and R with the size of 16 dots/mm for each pixel, and outputs the read image data as 24 bits (three colors×8 bits; 256 tones). The CCD sensor of 300 mm long and 16 dots/mm in density and having B, G and R filters attached to the upper surface thereof, performs a scan of 16 lines/mm at the process speed of 190.5 mm/sec. The sensor produces the image data at the speed of approximately 15M pixels per second for each color. The IIT 100 logarithmically-converts the analog data of B, G and R pixels, thereby transforming the reflectivity information into the density information, and converting it into digital data.

The IPS is made up of an END (equivalent neutral density) module 101, color masking module 102, document size detect module 103, color change module 104, UCR (under-color removal) & black generation module 105, spatial filter 106, TRC (tone reproduction control) module 107, enlargement/reduction module 108, and a screen generator 109. The IPS receives the color separated signals B, G and R from the IIT 100, and processes the received image data in various ways for improving the reproduction performances of color, tone, definition, and the like. The IPS converts the coloring material signals of the developing process colors into on/off signals, and transfers the converted signals to the IOT.

The END Module 101 adjusts (converts) the color image signals to gray-balanced color image signals.

The color masking module 102 converts the B, G and R signals into signals corresponding to the toner quantities of Y, M and C, through a matrix operation.

The document-size detecting module 103 detects the document size in a prescan mode, and erases (makes a frame-erasure) the platen color in a read scan mode.

The color change module 104 makes the change of a specified color in a specific area according to an area signal supplied from the area image control module.

The UCR & black generation module 105 generates a proper quantity of black K so as not to lose the color purity, subtracts the equal quantities of the process colors Y, M and C therefrom according to the quantity of black K, and gates the signals after the under-colors of the K, and Y, M and C are removed, according to the signals in a mono-color mode and a 4-full-color mode.

The spatial filter 106 is a nonlinear digital filter having the function of restoring the image from being blurred, and the function of removing moire from the image.

The TRC module 107 makes density, contrast, and color balance adjustments, and performs a negative/positive inversion and other processings for reproduction improvements. The enlargement/reduction module 108 is provided for enlarging and reducing the size of an image in the horizontal scan direction. Incidentally, the size adjustment in the vertical scan direction is performed by adjusting the speed of scanning the original.

The screen generator 109 converts tonal toner signals of the process colors into on/off or binary-coded signals. The binary-coded process color signals are output to the IOT 115, through an IOT interface module 110.

The area image control module 111 includes an area generator and a switch matrix. The area-image control module 111 is arranged so as to set seven rectangular areas and the priority order of the areas in an area generating circuit. In connection with the respective areas, control data for the areas is set in a switch matrix. The control data includes, for example, the color mode data of color change, color mode of mono-color or full-color, and modulation select for photograph, character or the like, and select data for TRC and screen generator, and is used for controlling the color masking module 102, color change module 104, UCR module 105, spatial filter 106, and TRC module 107. The switch matrix can be set by a software.

An edit control module includes a plane memory 112, a color palette video switch circuit 113, font buffer 114, and the like, and controls various types of edit functions. With the edit control module, painting processing can be performed in a manner that it reads a document image, such as a circle graph, not a rectangular, and paints out, with a specified color, a specified area indefinite in shape. 4-bit area commands are stored in a plane memory 112 consisting of four plane. An edit command at each point on the document is set with 4 bits of the 4-plane memory.

In the conventional image edit apparatus, in the image edit processing using the area data, the plane memory must be increased with an increase of the number of areas. Also in the apparatus, a data delay inevitably occurs through such a process that the area data is read out of the plane memory and is format-converted to generate area commands, and an edit command is read out of the logic RAM using the area command as an address. When an edit command is output, the edit command of 100 spi (spot per inch) must be adapted for the image data of 400 spi. To this end, for the vertical scan direction, the data on the same lines in the plane memory is read four times repeatedly. In the repetitive read process, the plane-to-pixel format conversion is performed. This also causes a data delay. (64+α) clocks are taken for the enlargement operation by the density conversion/area generating circuit REL. Accordingly, when the data is transferred to the circuit REL in synchronism with the line sync signal, the data is displaced by the quantity ((64+α) clocks) of delay within the circuit REL in the stage subsequent to the circuit REL. In the pipe-line processing of the image data, it is frequently required to apply edit commands to processing blocks preceding to the block (REL), in order to generate the edit commands.

SUMMARY OF THE INVENTION

Accordingly, an object of the present invention is to provide an image edit apparatus in which a desired number of image edit areas can be set without increasing the plane memory.

Another object of the present invention is to provide an image edit apparatus capable of synchronizing the image data with the edit command.

Yet another object of the present invention is to provide an image edit apparatus which eliminates the refresh cycle for the image data area, thereby giving rise to no reduction of the read/write access speed to the DRAM.

To achieve the above objects, there is provided an image edit apparatus comprising a plane memory into which area data corresponding to an original document has been written, first unit for generating area commands by converting the format of the area data from the plane type into the pixel type, memory unit for storing edit commands, and second unit for outputting edit commands, which are read out of the memory unit using the area commands as addresses.

In the image edit apparatus, area data in the plane memory is read out thereof at the timing of a pseudo line sync signal which rises earlier than a line sync signal for synchronizing image data in the horizontal scan direction.

The image edit apparatus may further comprises a DRAM controller for making a read/write access to the plane memory, and the DRAM controller is arranged so as to refresh the plane memory a necessary number of times during an inactive period of the line sync signal.

Area data of 16-bit width has been stored at the memory locations of the corresponding addresses of the memory planes of the plane memory. The first unit generates area commands by converting the format of the area data signal from the plane type into the pixel type. The second unit outputs edit commands of free width, which are read out of a logic RAM forming the memory unit using the area commands as addresses.

Since the operation of reading area data from the plane memory is started by a pseudo line sync FLS before the line sync LS becomes active, the delay in the density conversion/ area generating circuit as the first and second units is absorbed, so that the edit command that is output is synchronized with the image data.

A speed of the read/write access to the DRAM can be fully utilized by refreshing the DRAM during the inactive period of the line sync LS.

DETAILED DESCRIPTION OF PREFERRED EMBODIMENTS

Figure 1:
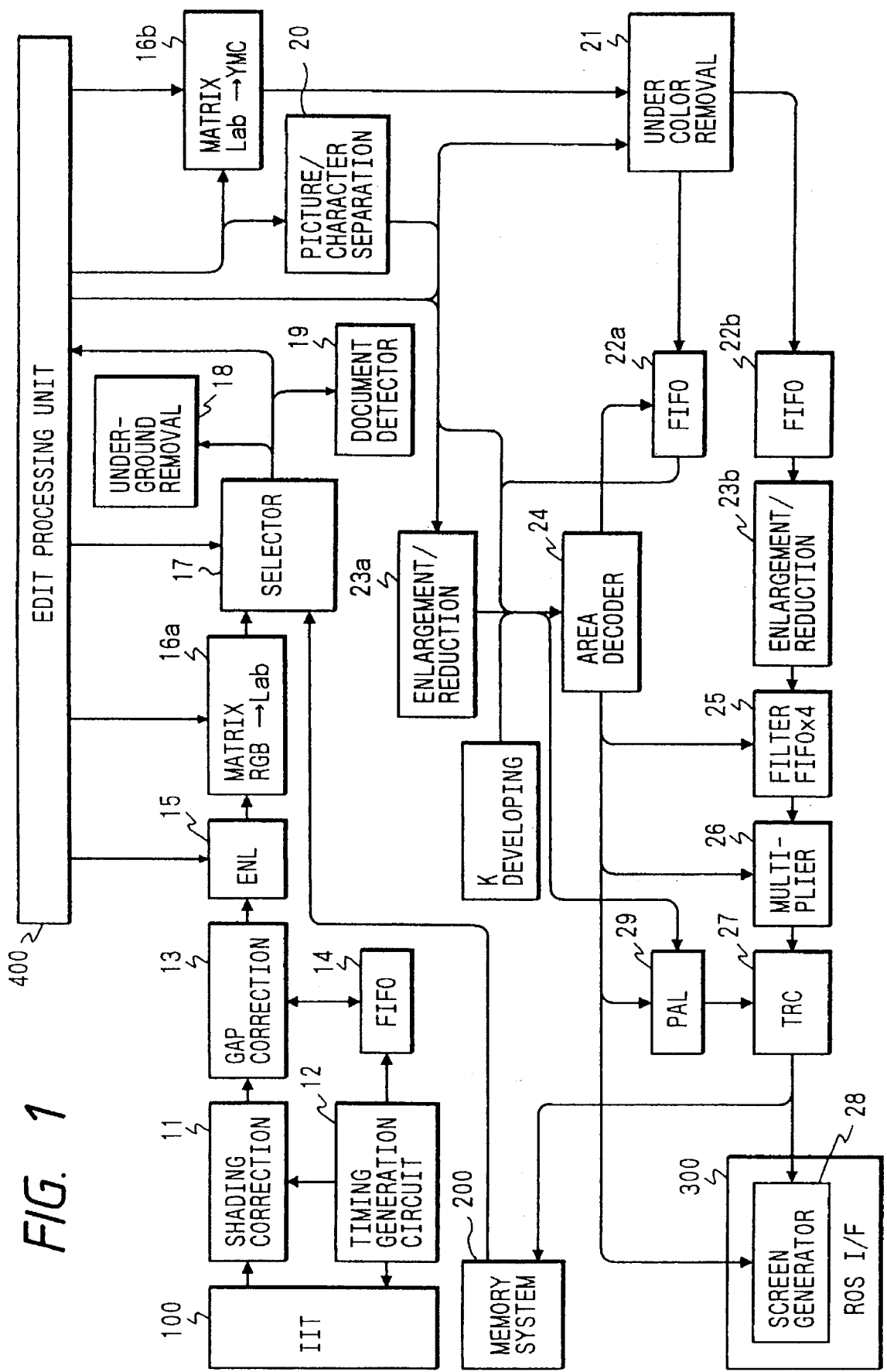
FIG. 1 is a block diagram showing an overall arrangement of the IPS.
Figure 2:
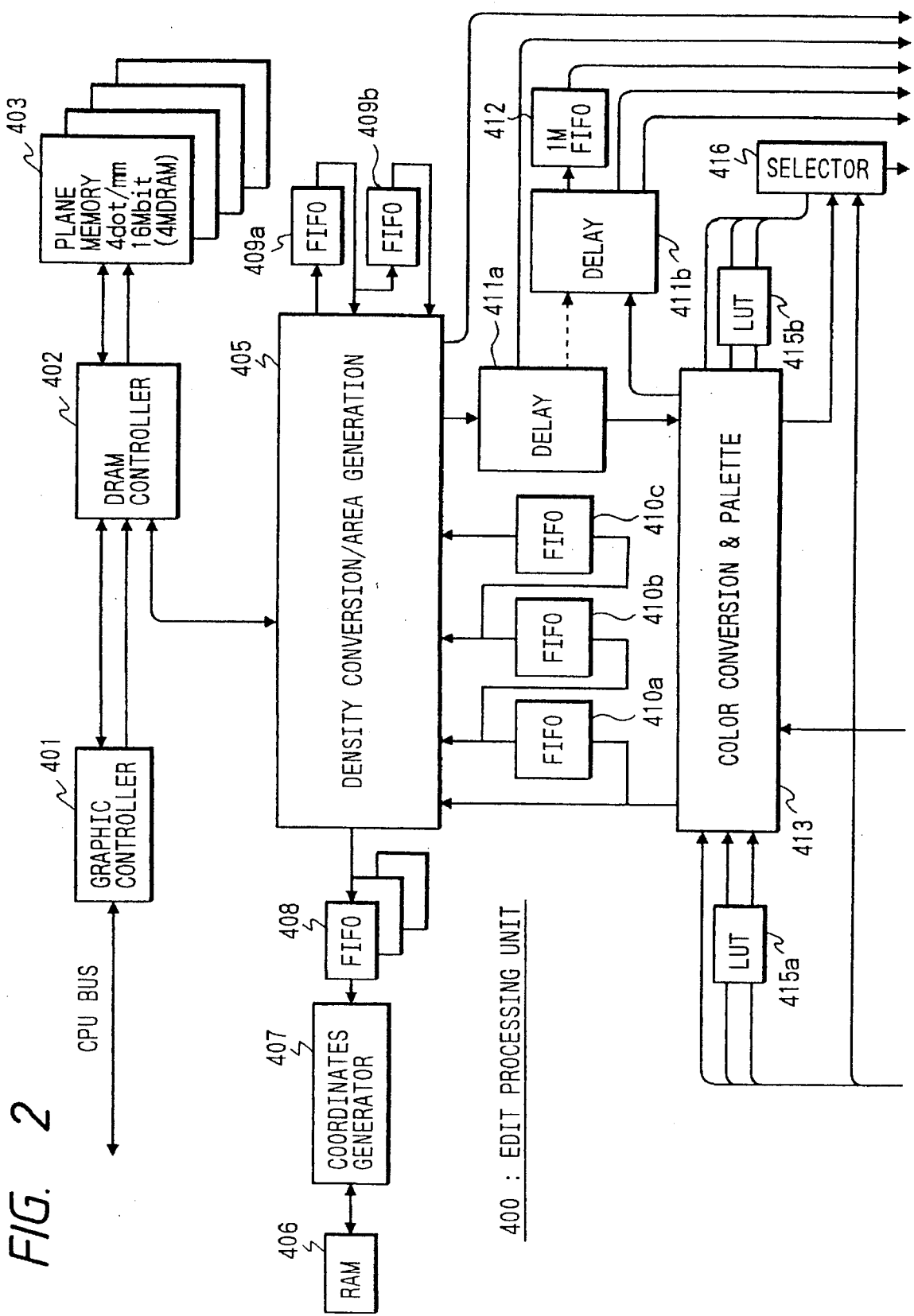
FIG. 2 is a block diagram showing the construction of an image edit processing unit.

An embodiment of the present invention will be described with reference to the accompanying drawings. The present invention concerns the image edit functions of the IPS. The construction and the respective portions of the IPS will be first described. FIG. 1 is a block diagram showing an overall arrangement of the IPS. FIG. 2 is a block diagram showing the construction of an image edit processing unit.

An image input terminal (IIT) 100 contains a size-reduction type sensor which consists of three line sensors of R, G and B arranged orthogonal to the vertical scan direction. The IIT 100 scans the original in synchronism with a timing signal from a timing generating circuit 12. The read image data suffering from the nonuniformity of the pixels owing to various factors is shading-corrected by a shading correction circuit 11, and applied to a gap correction circuit 13 where gaps among the line sensors are corrected. In the gap correction, the read image data is delayed by the quantities corresponding to the gaps by an FIFO (First-In-First-Out Structure Line Memory) 14 so that the R, G, and B image signals located at the same position appear at the same time point.

An ENL (equivalent neutral lightness) circuit 15 is provided for gray balancing the image data. The setting of gray levels in the image signal is inverted every pixel, viz., the negative/positive inversion is performed, by a negative/positive inverting signal from an edit processing unit 400 to be described later. The ENL circuit can selectively make the negative/positive inversion in only a specific image area.

A matrix circuit 16a converts the R, G and B image signals, which are gray-balanced by a control signal from the edit processing unit 400, into image signals $L^*$, $a^*$, and $b^*$. The conversion of the image signal from R, G and B to $L^*$, $a^*$ and $b^*$ is made for realizing easy interface of the system with other devices, such as computers.

A selector 17 selects either the output signal of the matrix circuit 16a or the image data from the memory system 200 as an interface with an external computer under control of a signal from the edit processing unit 400.

An underground removal circuit 18 detects an underground density by preparing a histogram of densities on the document through a prescan, and removes the pixels having densities lower than the detected underground density, thereby improving the copy quality of fog-contained documents like newspaper.

A document detector 19 detects and stores the size of an original document. To detect the document size, the detector 19 detects the boundary of the reverse side of a platen, thereby obtaining a rectangle defining the outer peripheral edge of the original.

A matrix circuit 16b converts the image signals of $L^*$, $a^*$ and $b^*$ color edited by the edit processing unit 400 into toner color signals of Y, M and C.

An image/character separation circuit 20 groups a plurality of image data color-edited into blocks to identify the area of color character, black character or image (character/halftone).

An under-color removal circuit 21 generates black (K) signal, and subtracts the equal quantities of the Y, M and C image data according to a monocolor/full color mode signal and black (K) to produce the image data of process colors. Further, it produces a hue signal through the hue decision. The hue signal is temporarily stored in an FIFO 22a, and the image data of the halftone image of image patterns, and black and color characters are temporarily stored in a FIFO 22b. The hue signal, together with the signal based on the image/character separation result from the image/character separation circuit 20, is decoded by an area decoder 24. According to the control signal, the processing portions of a filter 25, multiplier 26 and TRC 27 operate to process the image data from the FIFO 22b.

An enlargement/reduction circuit 23a is for enlargement or reduction of the image data so that area control data is applied exactly to the image to which it is to be applied, when the image data is enlarged and reduced. The enlarged or reduced area control data, when required, is decoded by the area decoder 24 and applied to the processings of the respective portions. The area decoder 24 generates signals to switch the parameters of the respective portions using edit commands, area identification and hue.

The image data reduced or enlarged by an enlargement/reduction circuit 23b is applied to the filter 25 where moire is removed therefrom and edges are emphasized. In the multiplier 26 and the TRC 27, the coefficients for the respective color components and the conversion table are properly selected to make the color adjustment and the density adjustment of color and black characters and image patterns. A multiplier 26 operates "ax+b" on the image data x having coefficients a and b, thereby correcting the conversion table of the TRC 27.

The TRC 27 adjusts the density according to the characteristic of the IOT. The image data is stored in a memory system or is output in the form of an image by a screen generator (ROS) 300.

A PAL 29 is a decoder for switching the conversion table of the TRC 27 by the developing process and the area identification. The image data adjusted by those is stored in a memory system or is output as a mesh-dot image by the screen generator 28.

The edit processing unit 400 will be described with reference to FIG. 2.

The edit processing unit 400 is provided for the processings of the color change and color edit, for generating area control signals, and receives the image data $L^*$, $a^*$, and $b^*$ from the selector 17. In an LUT 415a, the chromaticity data (hue and saturation) is transformed from the data $a^*$ and $b^*$ in the orthogonal coordinates system to the data C and H in the polar coordinates system. This is done for providing easy detection of marker and other colors, and rendering easy the color edit, color change and the like.

A color change & palette (CPS) 413 contains colors for color change and color edit in 32 number of palettes, and processes the image data $L^*$, C and H for marker color detection, color edit, color change and the like according to area commands supplied through a delay circuit 411a. Only the image data in the area to be color changed is input to the color change & palette 413, and output through an LUT 415b from a selector 416. The image data in the areas other than the color-changed area is directly output from the selector 416 and is transferred to the matrix conversion circuit 16b.

A density-conversion/area generating circuit 405 performs a reduction (REDUCTION) processing for reducing the data from 400 spi to 100 spi, an enlargement (ENLARGEMENT) processing for enlarging the data from 100 spi to 400 spi, and a smoothing (JGR) processing.

Figure 3:
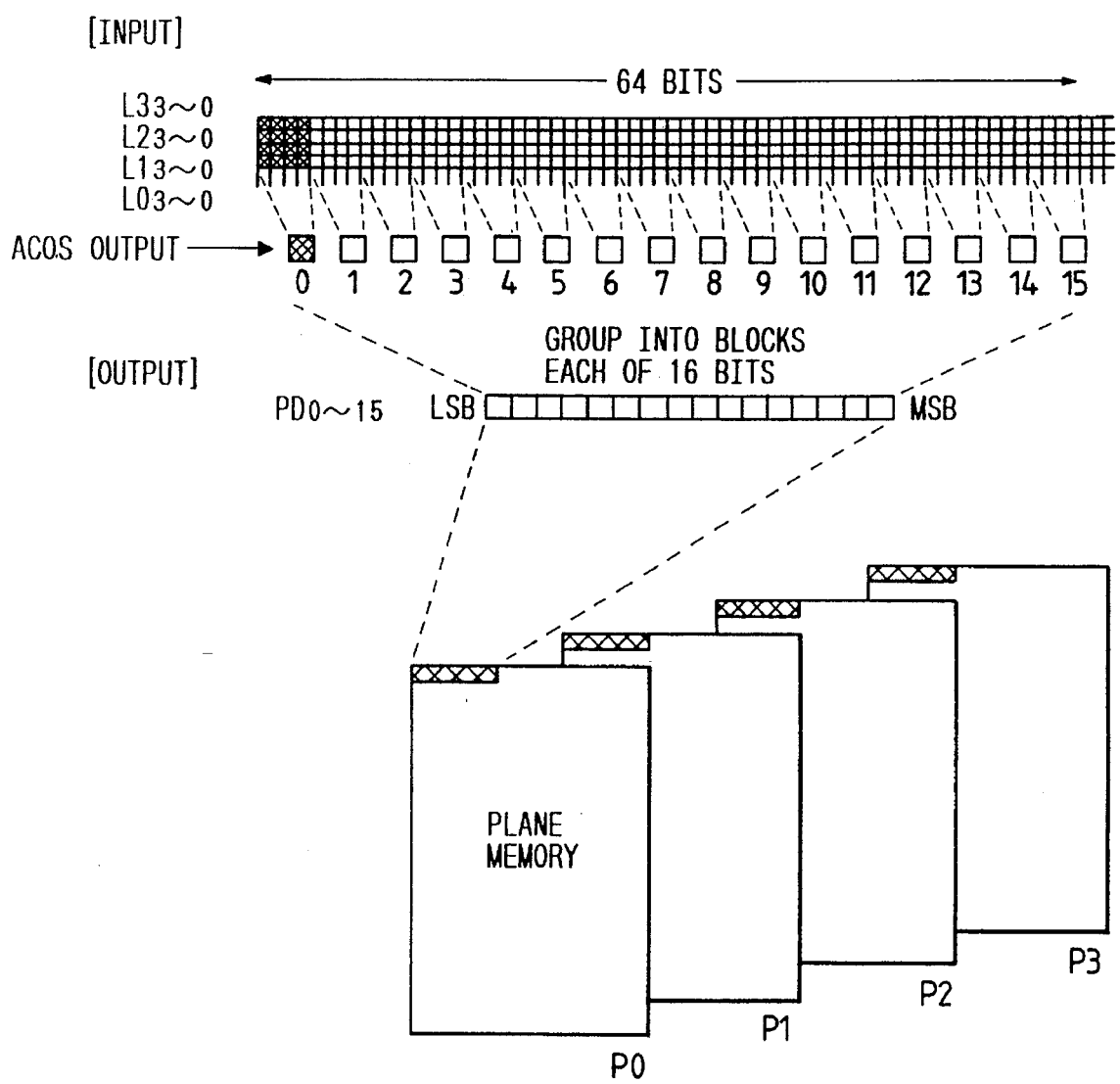
FIG. 3 is an explanatory diagram for explaining the reduction operation of the image edit apparatus.

In the reduction processing, as shown in FIG. 3, the 400 spi binary-coded image data $L0_{3-0}$, $L1_{3-1}$, $L2_{3-2}$, and $L3_{3-3}$ that are supplied from the CPS is grouped into blocks (each 16 pixels of 4×4). Further, it is reduced to 100 spi as 1-bit data by using two types of reduction systems. The data after being reduced is produced in the form of data $PD_0$ to $PD_{15}$ for each block of 16 pixels, and is written into the plane memory through the DRAM controller AMC. By using FIFOs 410a, 410b and 410c, with a window of 4×4, the data is binarized in a manner that "1" is assigned to the data of 16 pixels which contains black pixels of more than a predetermined number, or in the another manner that "1" is assigned to the data of 16 pixels which contains a black pixels of predetermined fitting positions in a window of 4×4. Through the binarizing process, the image data density is changed from 400 spi to 100 spi.

Figure 4:
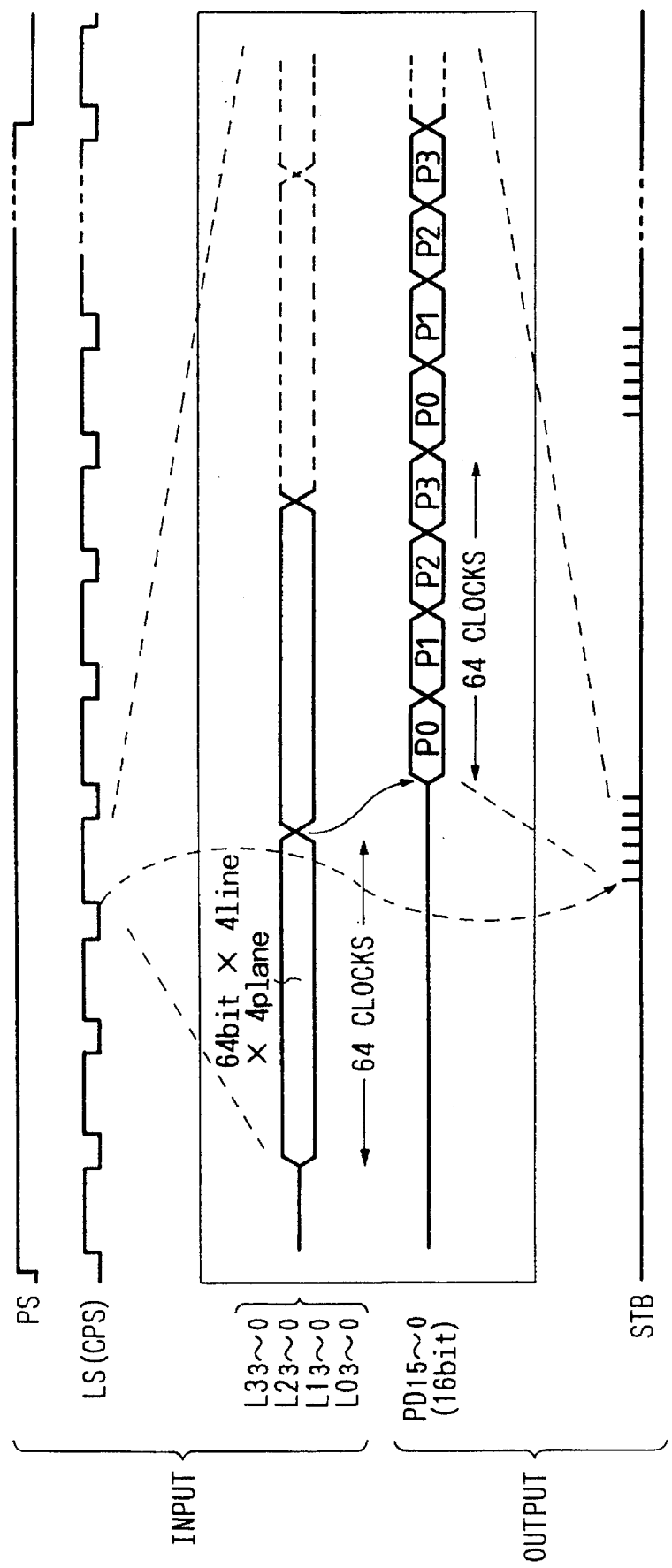
FIG. 4 is a timing chart for explaining the operation of the system in a reduction mode.

Thereafter, the generated marker signal (closed loop and marker dot) is written into the plane memory 403. To avoid the operation of mistakenly detecting dusty particles as markers, the marker dot signal is delayed by nine lines by a FIFO 408, the marker dot is detected with the 9×9 window, and the coordinate value is generated by a coordinate-value generating circuit, and is stored into a RAM 406. This processing is performed in order to prevent the mistaken detection, although the marker dots are also stored in the plane memory. FIG. 4 is a timing chart for explaining the operation of the system in a reduction mode. As shown, such a reduction processing is performed that the data valid every four lines is output by an STB signal output in synchronism with the line sync signal, and this is done by using the binary image data of 64 bits×4 lines×4 planes (64 clocks) at the leading edge of the fourth line of the line sync signal. As the result of the reduction processing, 16-bit data P0 to P3 (64 clocks) is output.

In this way, the 400 spi to 100 spi reduction processings of four color data are concurrently performed, each color image data is grouped into 16-pixel data units, and those data units of the four color image data are sequentially output. Accordingly, the four color image data are reduced in parallel, and the image data after size reduction can be concurrently written into the plane memory.

Figure 5:
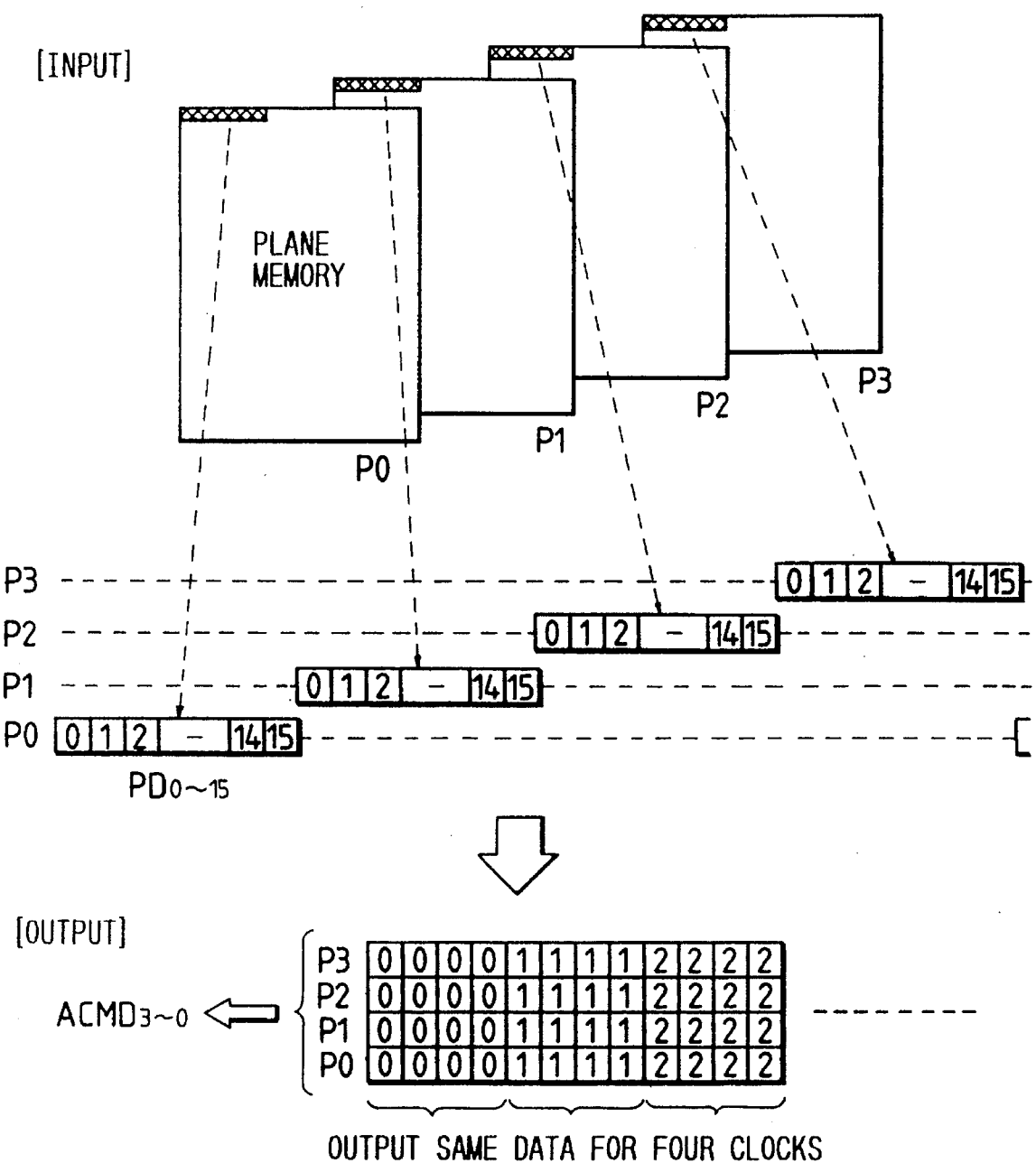
FIG. 5 is an explanatory diagram showing the outline of the enlargement operation.
Figure 6:
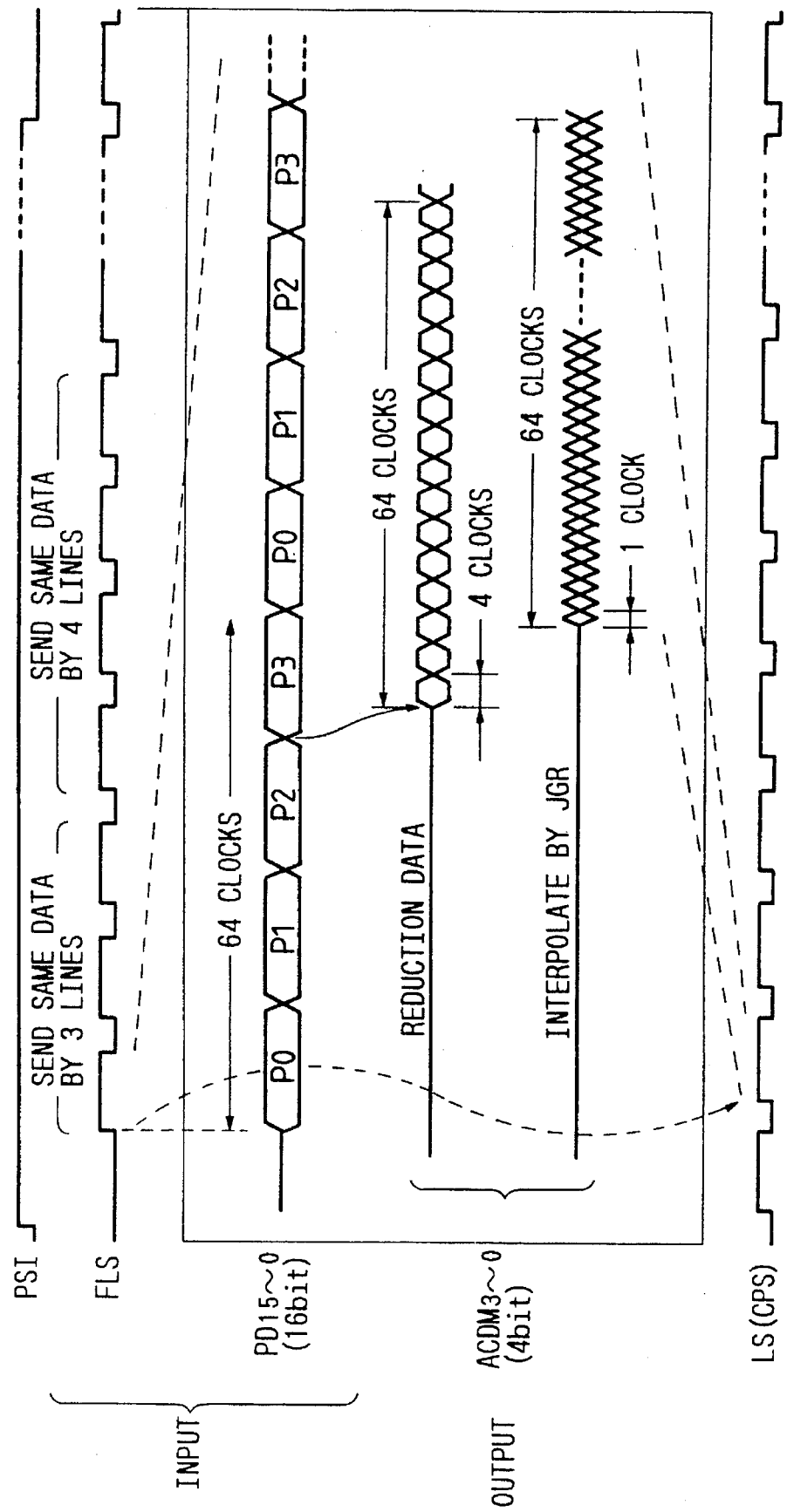
FIG. 6 is a timing chart showing the operations for both the enlargement and smoothing processings.

FIG. 5 is an explanatory diagram showing the outline of the enlargement operation. FIG. 6 is a timing chart showing the operations for both the enlargement and smoothing processings. In the enlargement processing, the format of the data of 100 spi stored in the plane memory is converted from the plane type to the pixel type, whereby an area command is generated. The area command of 4-bit width is output. In order to adapt the 100 spi resolution to the 400 spi, for the horizontal scan direction, the same data is repeatedly output four times for four clocks, while for the vertical scan direction, the DRAM controller AMC reads out the data on the same line of the plane memory four times. Through this process, the resolution of the plane memory storing the area data is reduced to be lower than that of the image data, and hence reduces the required memory capacity.

In a smoothing process, the same data is output by 4 bits (4 clocks), and the 4-bit data (reduction data) is interpolated on the basis of one bit (one clock) for one pixel, and then is output to the color change & palette (CPS).

The plane memory 403 is provided for storing area commands for color change, color edit, and other area edits. From the edit pad (not shown), the user can specify an area and write the area command into the specified area. The area command of the area specified from the edit pad is transferred through a CPU bus to a graphic controller 401, and then is written into the plane memory 403 through a DRAM controller 402. The plane memory 403 consists of four memory planes and is capable of simultaneously storing sixteen (16) types of area commands, 0 to 15.

The area commands of 4 bits stored in the plane memory 403 is read out of the memory in synchronism with the outputting operation of the image data. When the area command, which is read out of the plane memory 403, is used for the edit processing in the color change & palette 413 and for switching the parameters in the image processing system, it is required to convert the density from 100 spi to 400 spi. The density conversion is executed by the density conversion/area generating circuit 405. In the circuit 405, pixels are grouped into 3×3 blocks by using FIFOs 409a and 409b, and the data is interpolated according to the pixel block pattern. In this way, the density conversion from 100 spi to 400 spi is performed so as not to zig-zag closed loop curves and the boundaries of edit areas. Delay circuits 411a and 411b, 1MFIFO 412, and the like are provided for the timing adjustment of the area command to the image data.

Figure 7:
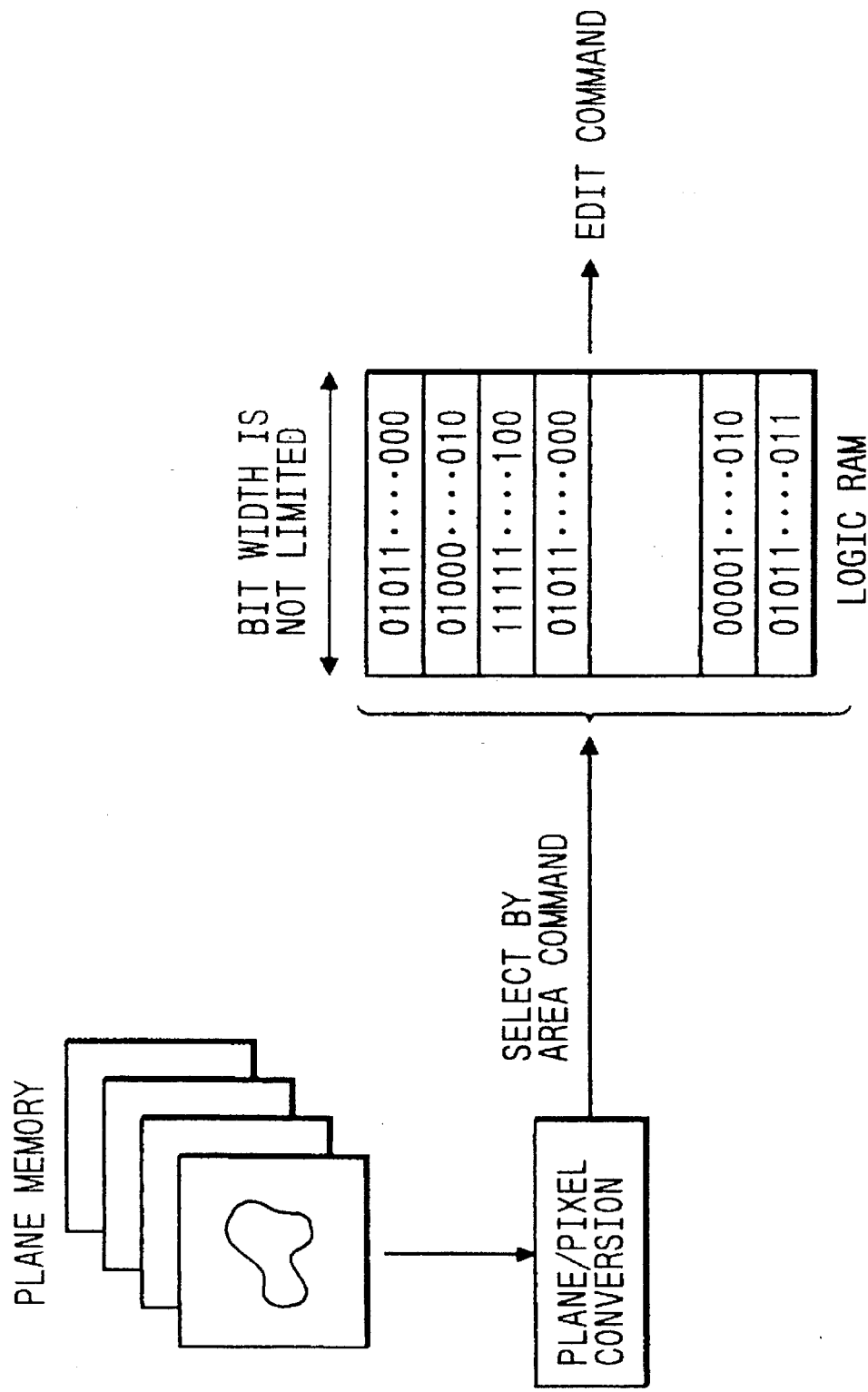
FIG. 7 is a diagram for explaining the basic concept of the image edit by using the area data.

FIG. 7 is a diagram for explaining the basic concept of the image edit by using the area data. The density-conversion/area generating circuit (REL) 405 reads the area data, which corresponds to the original document, from the plane memories, and converts the data format from the plane type to the pixel type, thereby generating area commands $AMCD_{3-0}$. Using the area commands as addresses, edit commands are read out of the logic RAM.

Figure 8:
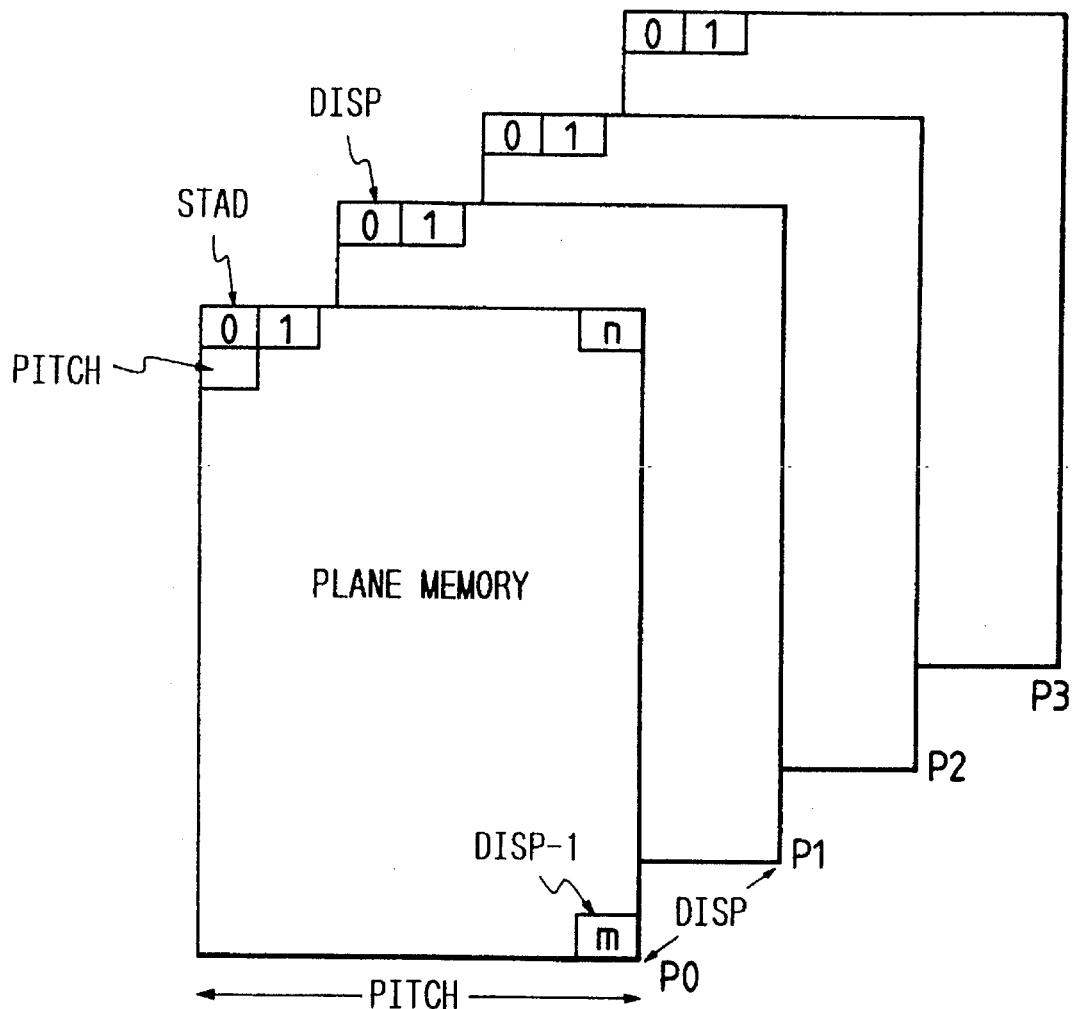
FIG. 8 is an explanatory diagram for explaining a plane memory.

The plane memory consists of four number (4 bits) of 4M-DRAMs each of 1,048,576 words×4 bits. As shown in FIG. 8, the values of STAD, PITCH, and DISP of each plane can be replaced with other values by the CPU. In this embodiment, the plane memory consists of four planes P0 to P3 at 100 spi of resolution. The area data of 16 bit(1word)-width has been stored at the memory locations of the corresponding addresses of the respective memory planes. In the figure, PITCH indicates the plane width, and DISP indicates the number of words of one plane.

The area data of 16-bit width $PD_0$ to $PD_{15}$, as shown in FIG. 5, is read out of the plane memory through the DRAM controller AMC. The data is format-converted from the plane type to the pixel type, thereby generating area commands. Using the area commands as addresses, edit commands of free width are read out of the logic RAM.

At this time, in order to make the 100 spi resolution to the 400 spi, for the horizontal scan direction, the same data is output repeatedly four times for four clocks, while for the vertical scan direction, the DRAM controller AMC reads out the data on the same line of the plane memory four times. Through this process, the resolution of the plane memory storing the area data is reduced to be lower than that of the image data, and hence reduces the required memory capacity.

Figure 9:
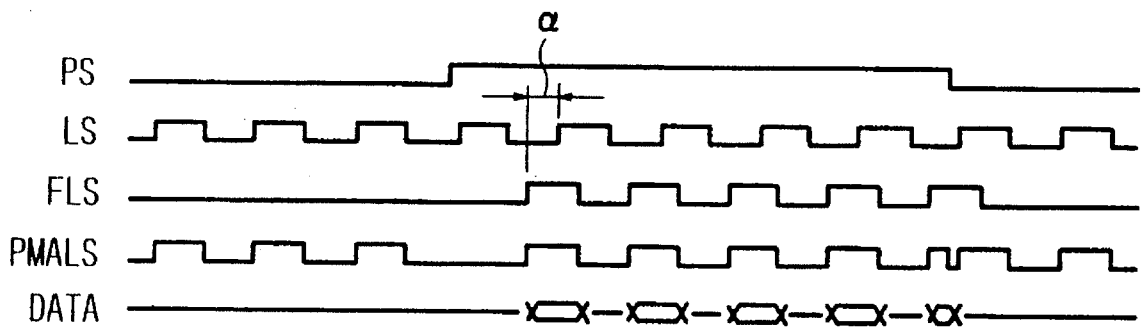
FIG. 9 is a timing chart showing the operation of reading area data using a pseudo sync signal.

The logic RAM, contained in the density-conversion/area generating circuit (REL), stores sixteen types of edit commands, as attribute data, of which bit (data) width is not limited. To remove the delay occurring during the format conversion, as shown in FIG. 9, the data read operation is started by a pseudo sync signal FLS which rises earlier than a sync (line sync) signal in the horizontal scan direction of the image data. As seen, the pseudo sync signal FLS is a sync signal of which the period is equal to that of the line sync LS which rises after a specified number of clocks counted from the trailing edge after the page sync (PS) becomes active.

The pseudo sync signal FLS can be rendered active a prescribed number α of clocks earlier than the active state of the second line of the line sync LS. That is, if the reading operation for the plane memory is started by the pseudo sync signal FLS before the line sync signal LS becomes active, the output edit command can be synchronized with the image data. The predetermined number α of clocks is the sum of the delay caused by the format conversion and time differences in the application of the area data to the processing blocks located preceding to the REL, such as the ENL 15, matrix circuit 16a, selector 17, and the like. As stated above, when the edit command is output, the area data on the same line in the plane memory is read out repeatedly four times in order to adapt the 100 spi resolution to the 400 spi resolution. Actually, the first operation of reading the area data of the first line is repeated three times, and the subsequent operations of reading the area data of the second and subsequent lines are each repeated four times. Accordingly, no area data is produced for the first line sync.

(64+α) clocks are required for the enlargement performed by the REL. Accordingly, if the data is transferred to the REL in synchronism with the line sync signal, the data will be displaced by the delay ((64+α) clocks) caused in the REL in the stages subsequent to the REL. To avoid this, the pseudo sync signal is generated FLS (64+α) clocks earlier than the line sync signal, and the read operation for the plane memory progresses in synchronism with the pseudo sync signal FLS. The data is transferred to the REL by a control signal called a plane memory addressing line sync PMALS. The plane memory addressing line sync PMALS is generated by switching the page sync signal PS to the pseudo sync signal FLS when the plane memory is placed in a read mode. In synchronism with this signal, the data is transferred to the REL. In the REL, an area command generated from the first line data of the plane memory that is transferred from the DRAM controller AMC is output in synchronism with the second line of the line sync signal applied to the color change & palette CPS. With such an arrangement, the delay caused in the REL can be absorbed without line buffers, for example, thereby removing the data displacement with respect to the image data. When the page sync PS becomes active, the data transfer of the data to the REL stops and the plane memory addressing line sync PMALS is switched from the pseudo sync signal FLS to the line sync signal LS.

In the REL, to enlarge the 16-bit data $D_{15}$ to $D_0$ of four lines (64 clocks) from one pixel to 4×4 pixels, the same data is output by 4 bits (4 clocks), and the 4-bit data (reduction data) is interpolated on the basis of one bit (one clock) for one pixel, and then is output to the color change & palette CPS. Accordingly, the delay caused in the REL can be absorbed without line buffers, for example, thereby removing the data displacement with respect to the image data.

Figure 10:
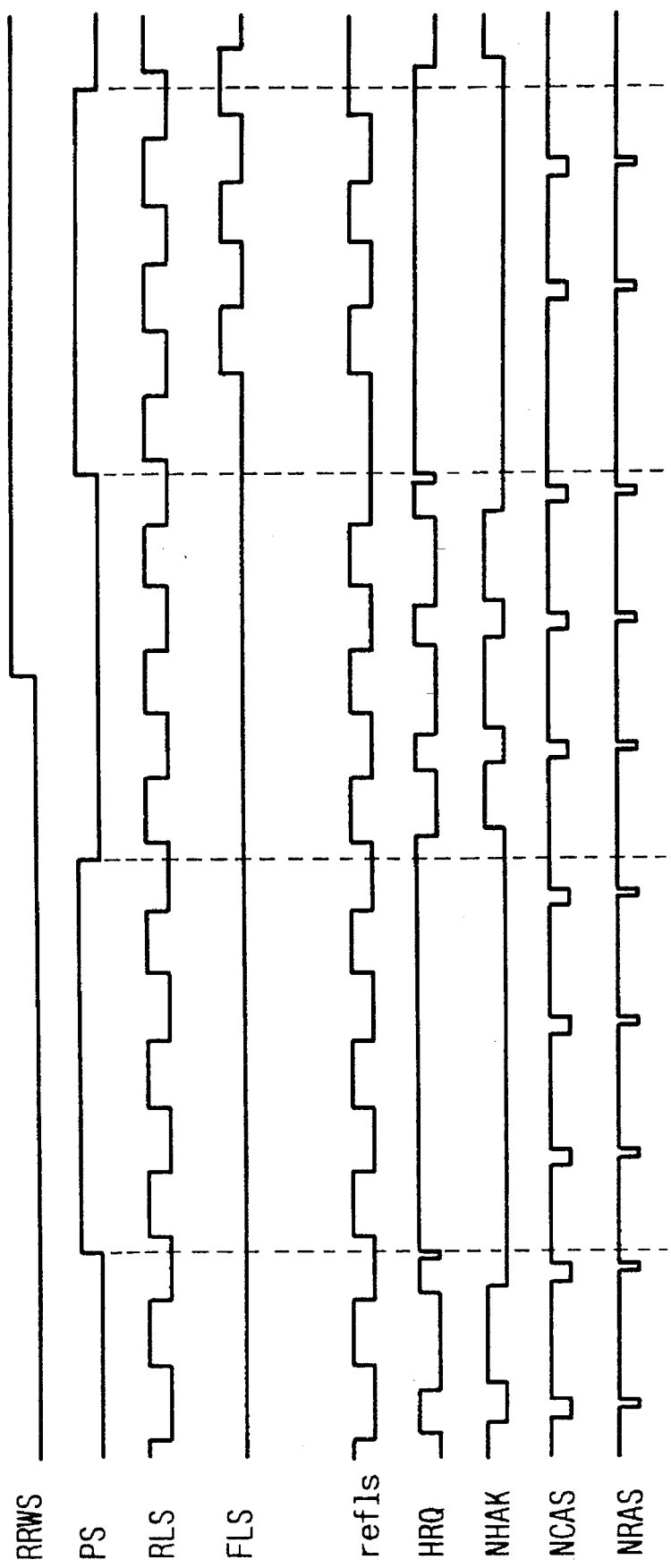
FIG. 10 is a timing chart showing the operation of refreshing a DRAM.
Figures 11A, 11B:
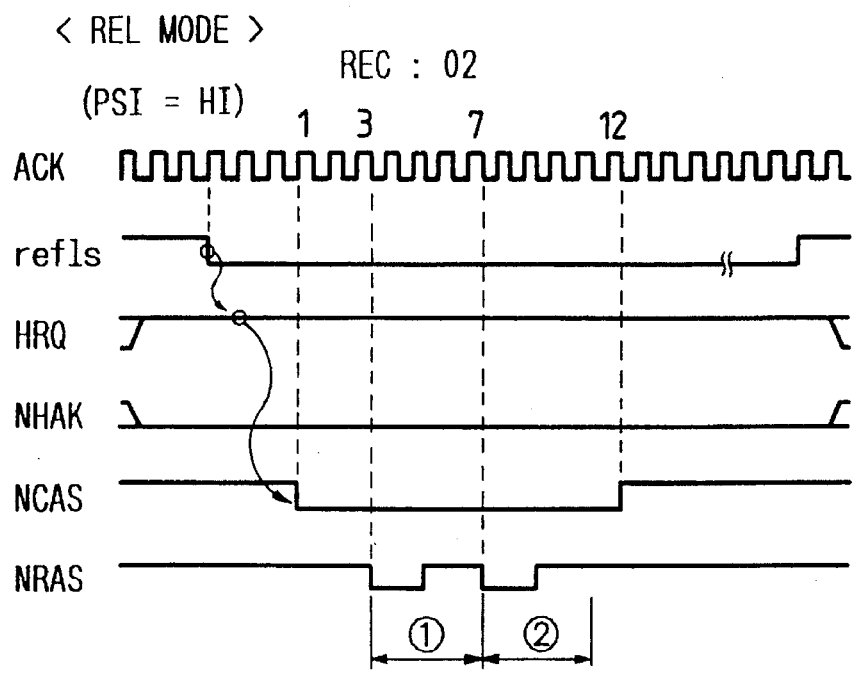
FIGS. 11A and 11B shows timing charts showing refresh cycles of the DRAM.

Next, a refresh cycle of the DRAM controller will be described. FIG. 10 is a timing chart roughly showing the refresh cycle of the DRAM controller. FIGS. 11A and 11B are respectively a timing chart of the refresh cycle in a REL mode and that in a graphic controller mode when REC (refresh cycle) =2 times. In the figure, ACK indicates the master clock for the DRAM controller AMC; "refls", a line sync signal for refresh cycle as a reference signal for refresh cycle; HRQ, a signal, called a hold request, requesting the right of using the graphic bus to the graphic controller; NHAK, a signal, called a hold acknowledge, permitting the use of the graphic bus to the graphic controller; and NCAS (row address strobe) and NRAS (cole address strobe), signals for controlling the addresses two times because the number of address lines is half the required number of address lines.

A refresh cycle DRAM requires a predetermined number of refresh cycles for a fixed period of time, while it rejects the read/write access thereto during the refresh cycle. This leads to a reduction of the access speed. To cope with this, the refresh cycles are all executed during the inactive period of the line sync LS. The number of refresh cycles is set, which is more than a minimum value of the number of refresh cycles, calculated by using the following equation (1), and is within the inactive time of the line sync signal LS.

$$16 \text{ ms: line cycle} = 1024 \text{: number of refresh} \qquad (1)$$

The number of refresh cycles obtained by the equating (1) represents the general number of refresh cycles of a 4M DRAM. If the memory is thus refreshed during the inactive period of the line sync LS, no refresh cycle is required for the image data area. The speed of the read/write access to the DRAM can be fully utilized.

Since the graphic controller accesses the DRAM in asynchronism with the refresh cycle of the DRAM, the access must be stopped during the execution of the refresh cycle. To this end, as shown in FIG. 11B, a hold request signal HRQ, before the refresh cycle execution, is applied to the graphic controller, thereby stopping its access to the DRAM, and the return of a hold acknowledge signal NHAK from the graphic controller is confirmed. Then, the refresh cycle is executed. After the refresh cycle ends, the hold request signal HRQ is immediately stopped, to allow the graphic controller to use the graphic bus. In this way, it is possible to smoothly execute the refresh cycle being performed in asynchronism with the access operation of the graphic controller. Further, immediately after the refresh cycle ends, the right to use the graphic bus is transferred to the graphic controller, ensuring a smooth operation of the graphic controller.

Figure 12:
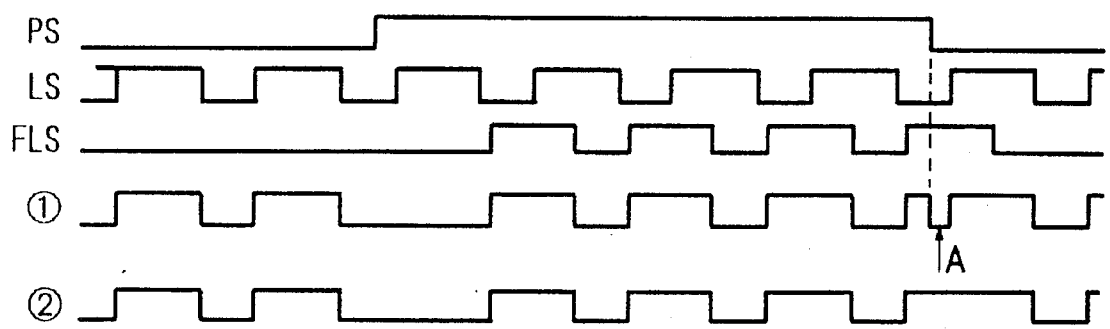
FIG. 12 is a timing chart showing another refresh cycle of the DRAM.

As shown in FIG. 12, a signal (1) is switched from the line sync signal LS to the pseudo line sync FLS by the page sync PS. Since the inactive period of a signal (1) is short in the vicinity of the switching point A, the shortage will hinder the correct refresh cycle. To avoid this, a refresh control signal like a signal (2) is generated, and the DRAM is refreshed in synchronism with the signal (2). With this arrangement, the DRAM can be refreshed independently of the change in the line cycle ensuing from the LS-to-FLS signal switching operation. Accordingly, it is easy to set the number of refreshes to be executed during one line cycle, and to remove the data disappearance in the DRAM (phenomenon that the stored data disappears with time), which is caused by the mistaken refresh-cycle execution, and the like.

Figure 13:
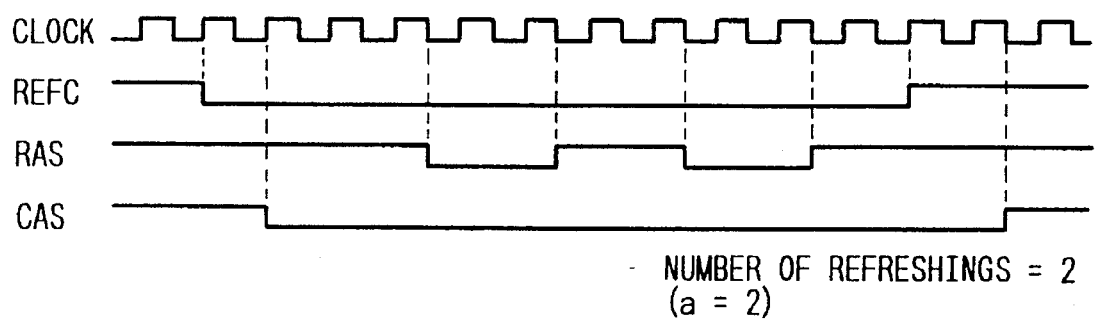
FIG. 13 is a timing chart showing yet another refresh cycle of the DRAM.

When during the inactive period of the line sync LS the DRAM is refreshed a necessary number of times in a refresh (CASK-before-RAS refresh cycle) not requiring an external refresh address, if the number of RAS signal generations is fixed, any measure cannot be taken for the changes of the line cycles or the refresh cycles of the DRAM. The DRAM controller AMS completes one cycle of the RAS signal for 4 clocks, as shown in FIG. 13. The DRAM controller AMC controls so as to generate the CASK-before-RAS refresh cycle during the period that the refresh control signal (REFC) is at Low. The circuit arrangement of the DRAM controller AMC necessitates "RAS signal (one cycle)+3 clocks" for generating one CASK-before-RAS refresh cycle, from the circuit construction point of view. The Low period of the refresh control signal REFC is calculated using equation (2) below, to control the refreshing operation therewith. The number of cycles "a" of the RAS signal is set from external devices (e.g., CPU).

$$REFC\ (clock)=4\ (clocks) \times a\ (cycle)+3\ (clocks) \qquad (2)$$

Since the number of RAS signal generations is thus set to be variable for the CASK-before-RAS refresh cycle, the changes of the inactive period of the line sync, line cycle, and the refresh cycle of the DRAM, and the like, can be properly dealt with.

The operation of the access operation of the DRAM controller AMC will be described.

(1) AMC capable of taking different address accesses for read and write modes:

In the case of the plane memory shown in FIG. 8, for example, the following start address given by the following equation is set in the read mode, the data can be read starting with the n-th line data.

(Start address in a write mode)+(Plane width)×n =(Start address in a read mode)

Figure 14:
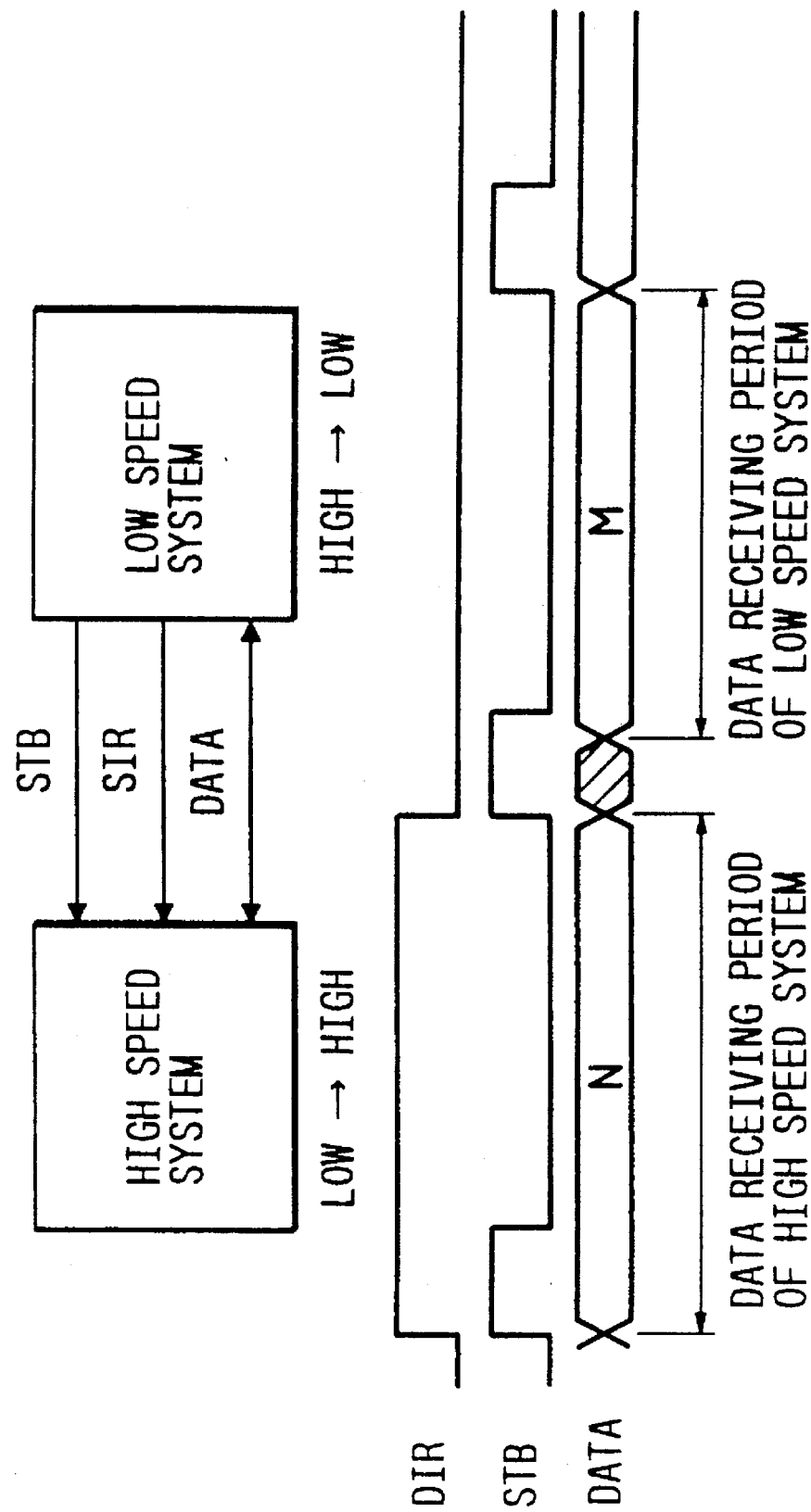
FIG. 14 is a block diagram showing the data transfer between systems of different clock frequencies and a timing chart showing the data transfer.
Figure 15:
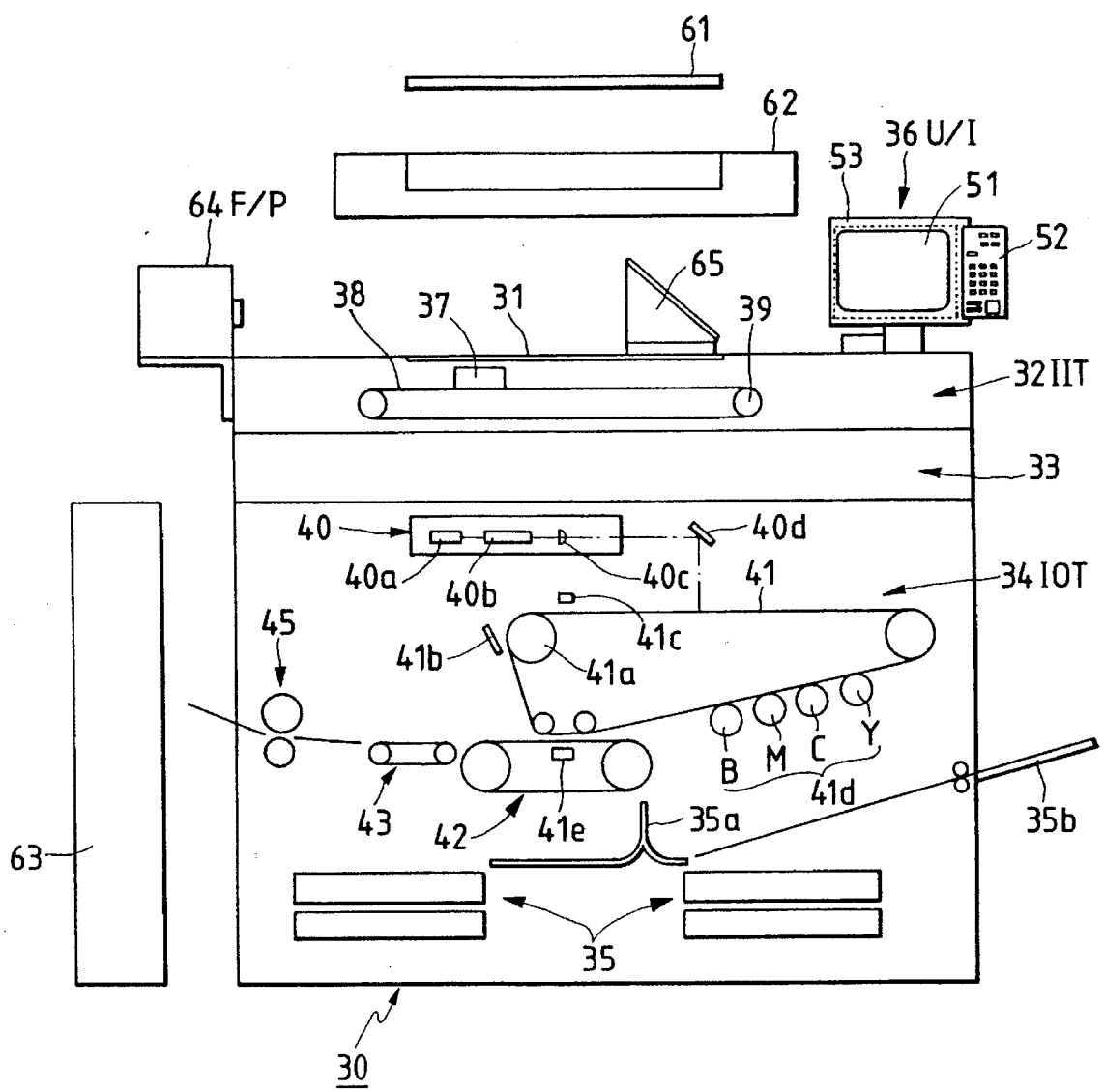
FIG. 15 is a diagrammatic view showing the construction of a digital color copying machine.
Figure 16:
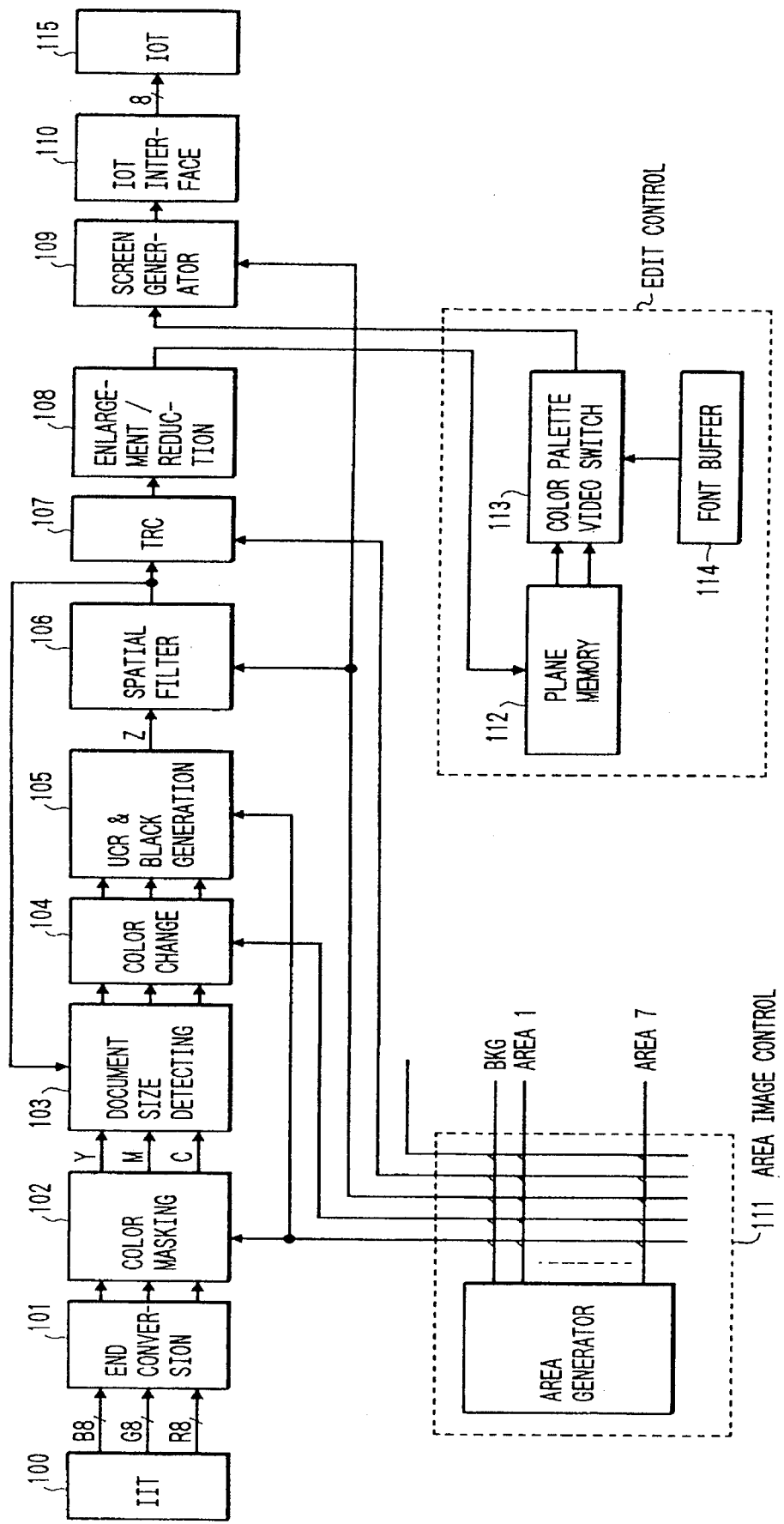
FIG. 16 is a block diagram showing the arrangement of the image data processing system of a prior color digital copying machine.

(2) AMC capable of making the access using a video clock asynchronous with the master clock FIG. 14 is a block diagram showing the data transfer between systems of different clock frequencies and a timing chart showing the data transfer. For the data transfer between systems of different clock frequencies, handshake lines (STB and ACK signals), by convention, have been used for synchronizing them. However, the drive for the handshake lines suffers from a large overhead and in this respect use of the handshake lines is unsuitable for high speed data transfer.

In the present invention, when data is transferred from a low speed system to a high speed system, the low speed system transfers N data using a DATA line and at the same time sends an STB pulse to the high speed system. On the other hand, the high speed system checks the STB line and receives the N data.

With regard to the data transfer from the high speed system to the low speed system, the low speed system sends the STB pulse signal to the high speed system when it needs data. The high speed system checks the STB line, and transfers M data using the DATA line, to the low speed system. The low speed system receives the M data at a proper point in time.

Thus, the low speed system takes charge of the DIR signal indicating the data transfer direction and the STB signal indicating the data transfer start, and manages the transfer periods. Therefore, the high speed data transfer, which uses the handshake line and is free from data drop, can be realized using only the STB signal.

As described above, according to the invention, area data is written into the plane memory by the graphic controller, so that the edit command stored in the logic RAM can be applied to the original document. The types of areas allowed to be written into the plane memory are limited by the number of planes of the plane memory, but the number of areas is not limited. Therefore, if the data width of the logic RAM is broadened, an infinite number of edit commands can be applied to one area.

Additionally, since the read operation for the plane memory starts by the pseudo line sync FLS before the line sync LS becomes active, the edit command can be synchronized with the image data.

Furthermore, since the memory is refreshed during the inactive period of the line sync, no refresh cycle is required for the image data area, the read/write access speed for the DRAM can be fully utilized.

What is claimed is:

1. An image edit apparatus comprising:

a plane memory storing area data corresponding to an original document, the area data stored in the plane memory having a plane type format;

first means for reading the area data from the plane memory and for converting the format of the read area data from a plane type to a pixel type to generate area commands;

memory means for storing edit commands;

second means for reading the edit commands from the memory means using the area commands generated by the first means as addresses;

the first means reading the area data stored in the plane memory and being timed by a time advanced sync signal which rises earlier than a line sync signal, the line sync signal synchronizing image data in a horizontal scan direction, and wherein the time advanced sync signal rises at a timing earlier than the line sync signal by an internal delay time of the first and second means which internal delay time is required to generate the area commands and edit commands.

2. The image edit apparatus according to claim 1, further comprising a dynamic-random-access memory controller for making a read/write access to said plane memory, the dynamic-random-access memory controller being arranged to refresh the plane memory during an inactive period of said line sync signal.

* * * * *